United States Patent [19]

Hebels et al.

[11] Patent Number: 4,904,425
[45] Date of Patent: Feb. 27, 1990

[54] METHOD OF REDUCING TENSION IN WEBS OF THERMOPLASTIC MATERIAL

[75] Inventors: Albert Hebels, Hamburg; Ralph Pagendarm, Halstenbek, both of Fed. Rep. of Germany

[73] Assignee: Pagendarm Beschichtungstechnik GmbH, Hamburg, Fed. Rep. of Germany

[21] Appl. No.: 211,351

[22] Filed: Jun. 24, 1988

[30] Foreign Application Priority Data

Jul. 7, 1987 [DE] Fed. Rep. of Germany ....... 3722346

[51] Int. Cl.$^4$ ............................................. B29C 61/02
[52] U.S. Cl. ................... 264/40.1; 264/40.6; 264/210.5; 264/342 RE; 425/143
[58] Field of Search ...................... 264/40.1, 40.6, 40.7, 264/342 R, 342 RE, 210.5; 364/473; 26/74, 106, 18.5; 425/143, 170

[56] References Cited

U.S. PATENT DOCUMENTS

| | | | |
|---|---|---|---|
| 3,347,960 | 10/1967 | Fenley | 264/40.6 |
| 3,610,897 | 10/1971 | Gerhard et al. | 364/473 |
| 3,646,188 | 2/1972 | Campbell | 264/40.6 |
| 3,782,873 | 1/1974 | Lynnknowles | 364/473 |
| 4,329,315 | 5/1982 | Brower et al. | 264/342 RE |

Primary Examiner—James Lowe
Attorney, Agent, or Firm—Peter K. Kontler

[57] ABSTRACT

A running web of thermoplastic material is uniformly relaxed across its width by monitoring the tension in its marginal sections and by adjusting the corresponding heaters adjacent the path of the marginal sections. The median section of the web is relaxed in response to generation of a signal which denotes the tension profile across the entire web and is obtained as a result of the processing of signals which denote the monitored tension in marginal sections of the web. Those sections of the web wherein the tension is higher are heated less intensively than the sections wherein the tension is lower.

5 Claims, 2 Drawing Sheets

METHOD OF REDUCING TENSION IN WEBS OF THERMOPLASTIC MATERIAL

BACKGROUND OF THE INVENTION

The invention relates to improvements in methods of reducing tension in webs of thermoplastic material, and more particularly to improvements in methods of thermally relaxing such webs.

It is customary to heat thermoplastic webs in order to eliminate the so-called residual shrinkage, i.e., to relax (reduce tension in) such webs preparatory to further processing. As a rule, the web which is to be relaxed is caused to advance through a so-called continuous-flow heater. A drawback of presently known methods is that they cannot ensure predictable and accurate relaxation of thermoplastic webs all the way between as well as in their marginal sections.

OBJECTS AND SUMMARY OF THE INVENTION

An object of the invention is to provide a novel and improved method which ensures predictable and accurate relaxation of all sections of a running web of thermoplastic material.

Another object of the invention is to provide a novel and improved method of applying heat to a running web of thermoplastic material for the purpose of relaxing the web so as to ensure that the tension in all longitudinally extending sections of the web will match or closely approximate a selected value.

An additional object of the invention is to provide a method which can be practiced in connection with wide or narrow webs as well as with webs which consist of any one of a variety of thermoplastic materials.

The invention resides in the provision of a method of thermally relaxing a running web of thermoplastic material. The method comprises the steps of ascertaining the tension in longitudinally extending sections of the web, and admitting heat to the sections at a rate which is a function of the ascertained tension in the respective sections of the web. The admitting step includes supplying lesser quantities of heat to sections wherein the tension is higher and greater quantities of heat to sections wherein the tension is lower.

The ascertaining step can include monitoring or measuring the tension in the marginal sections of the web, and the method can further comprise the step of processing the results of measurement of tension in the marginal portions of the web into signals denoting the tension profile across the web. The admitting step of such method can comprise supplying heat to the marginal sections of the web as a function of the results of measurement of tension in the respective marginal sections, and supplying heat to the web intermediate the marginal sections as a function of signals denoting the tension profile of the web. The arrangement is preferably such that the admitting step includes supplying heat as a function of the intensity of signals so as to maintain the tension of the web at a relatively low and substantially constant value.

The novel features which are considered as characteristic of the invention are set forth in particular in the appended claims. The improved method itself, however, together with additional features and advantages thereof, will be best understood upon perusal of the following detailed description of certain specific embodiments of a presently preferred apparatus for the practice of the method with reference to the accompanying drawing.

DESCRIPTION OF PREFERRED EMBODIMENTS

Figure 1:
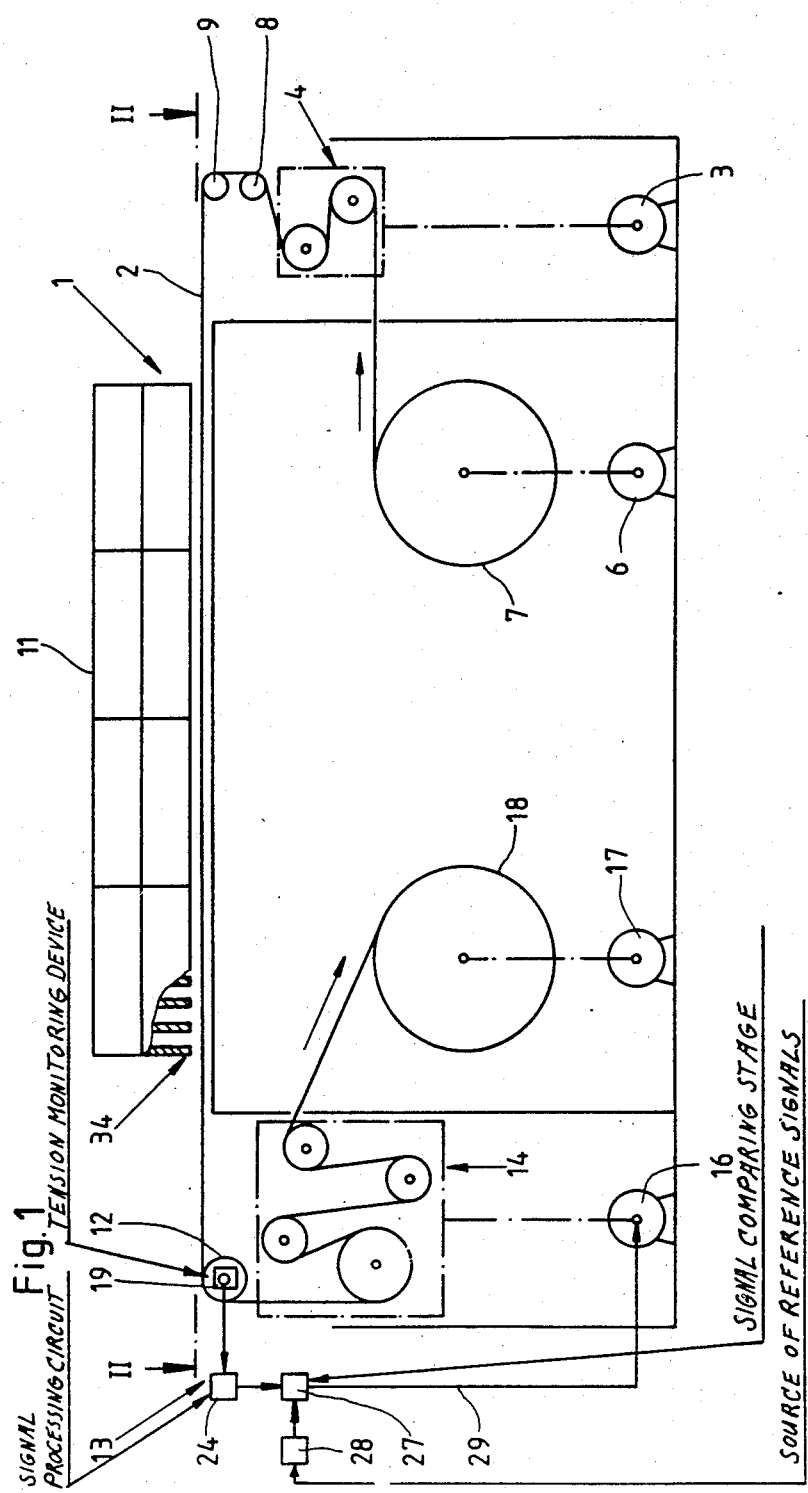
FIG. 1 is a schematic elevational view of an apparatus for the practice of a method which embodies the invention and wherein the heating means for the running web comprises a series of four successive stages.
Figure 2:
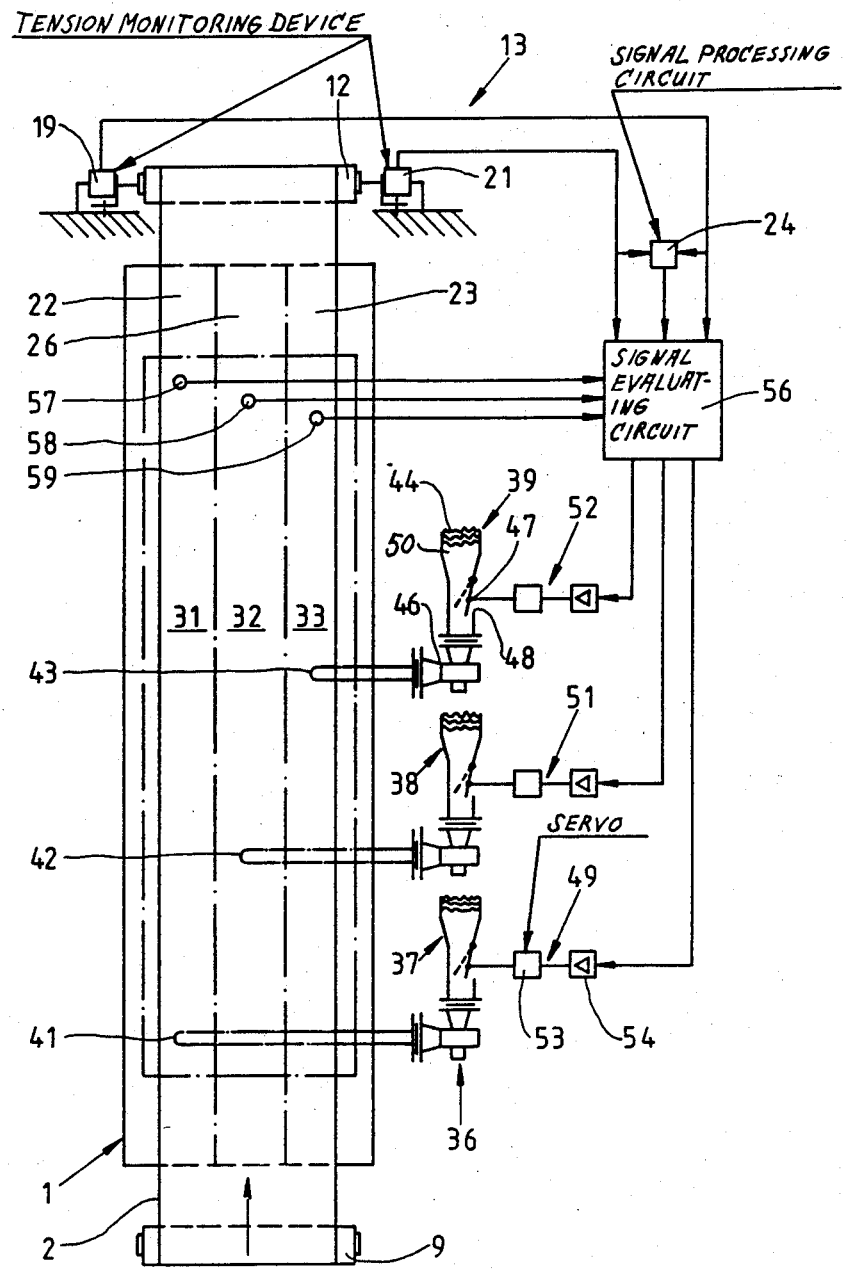
FIG. 2 is an enlarged fragmentary plan view of the apparatus, showing a single unit of the heating means and the associated tension monitoring and adjusting means for the heating means substantially as seen in the direction of arrows from the line II—II of FIG. 1.

Referring first to FIG. 1, there is shown an apparatus for relaxing (reducing tension in) a running web 2 of thermoplastic material. The purpose of relaxing is to eliminate from the running web 2 residual shrinkage by the application of heat. The apparatus comprises a continuous-flow heater 1 through or along which the web 2 advances on its way from a supply reel 7 toward a takeup reel 18. The supply reel 7 is driven by a variable-speed electric or other suitable motor 6, and the web 2 is drawn off the supply on the core of the reel 7 by a set of advancing rolls 4 at least one of which is driven by a variable-speed electric or other motor 3. The web 2 is further trained over pulleys 8 and 9 and advances through the heating station in such a way it does not contact any component parts of the heater 1. A rotary element 12 in the form of an elongated roll or pulley is disposed downstream of the heater 1 (as seen in the direction of advancement of the web 2, and the web is trained over the rotary element 12 on its way into the range of rolls forming part of adjustable advancing means 14 driven by a variable-speed motor 16 and serving to pull successive increments of the web 2 through the heating station. The heater 1 defines an elongated heating chamber 11 at a level above the path of movement of the web 2 between the pulley 9 and the rotary element 12. The latter forms part of a tension ascertaining or monitoring means 13 for the two marginal sections or portions 22 and 23 (see FIG. 2) of the running web 2. The rolls of the advancing means 14 are preferably cooled so as to reduce the temperature of the web 2 in a predictable manner. The motor 16 for one or more rolls of the advancing means 14 is adjustable so that its speed varies as a function of changes in the characteristics of signals which are generated by the tension monitoring means 13. The takeup reel 18 is driven by a further variable-speed electric or other suitable motor 17. The motors 16 and 17 are adjusted in such a way that the tension of the web 2 between the advancing means 14 and the takeup reel 18 exceeds the tension of the web between the advancing means 14 and the advancing rolls 4 (i.e., the tension in the region of the heater 1 is less pronounced than downstream of the advancing means 14).

The web 2 is trained over the rotary element 12 of the tension ascertaining or monitoring means 13 in such a way that its marginal portions or sections 22, 23 are adjacent the respective end portions of the rotary element (see the upper portion of FIG. 2), and the end portions of the rotary element 12 are rotatable in bearings forming part of two tension monitoring devices 19, 21 for the marginal sections 22, 23 of the web. The monitoring devices 19, 21 can be of conventional design; for example, each of these devices can be of the type known as KF6 manufactured by Liedtke Antriebstechnik German Federal Republic. The tension monitoring or ascertaining means 13 further comprises a signal processing circuit 24 which receives signals from the outputs of the monitoring devices 19, 21 and converts such signals into additional signals denoting the tension profile across the width of the web 2. The additional signals at the output of the signal processing circuit 24 are indicative of tension in the median section 26 of the web 2, i.e., between the marginal sections 22 and 23.

As can be seen in FIG. 1, the output of the signal processing circuit 24 is connected with one input of a signal processing stage 27 another input of which receives a signal from a preferably adjustable source 28 of reference signals denoting the desired tension in the web 2 downstream of the advancing means 14. If the signal at the output of the signal processing circuit 24 deviates from the reference signal, the stage 27 transmits a signal to the controls of the motor 16 which adjusts the advancing means 14 so as to increase or reduce tension in the web 2 between the advancing means 14 and the advancing rolls 4. The operative connection between the signal comparing stage 27 and the motor 16 for the advancing means 14 is shown at 29. The source 28 of reference signals is preferably set in such a way that the web 2 which advances toward the advancing means 14 is subjected to a relatively low but constant tensional stress by the rolls of the advancing means 14.

Signals which are generated by the monitoring devices 19, 21 and circuit 24 are transmitted to an evaluating circuit 56 which transmits signals to discrete adjustable heating units 37, 38 and 39 for the sections 22, 26 and 23 of the running web 2. The heating units 37 to 39 are adjustable independently of each other in response to signals from the evaluating circuit 56 so as to ensure that the tension in the sections 22, 26 and 23 of the web 2 is relaxed with a view to ensure that the tension will be uniform across the entire web (from edge to edge) when successive increments of the web leave the region of the heating chamber 11. The latter is subdivided into three heating zones 31, 32, 33 for the sections 22, 26 and 23, respectively. Each of the heating zones 31, 32, 33 includes a set of nozzles 34 (FIG. 1) with orifices which direct streams of hot gaseous fluid (normally air) against the upper sides of the respective sections of the running web 2. The heating means 36 for air which is discharged from the chamber 11 in a direction toward the upper side of the web 2 comprises the aforementioned three discrete adjustable heating units 37, 38 and 39 with outlets 41, 42, 43 which respectively supply hot air for treatment of the sections 22, 26, 23 of the web 2 beneath the nozzles 34, i.e., into the respective heating zones 31, 32 and 33.

Each of the adjustable heating units 37, 38, 39 comprises an electric resistance heater 44 at the inlet of a conduit 50 which admits atmospheric air under the action of a blower 46 which forces the thus heated atmospheric air into the respective outlet 41, 42 or 43. Each conduit 50 is further provided with an inlet 48 for unheated atmospheric air, and the inflow of unheated air by way of the inlet 48 is regulated by a flap 47 which is pivotable by the respective servomotor 53 forming part of the corresponding temperature adjusting means 49, 51 or 52. Fresh air (if any) which is admitted via opening 48 is admixed to air which has been heated by the electric heater 44 so that the temperature of hot air entering the respective outlet 41, 42 or 43 is a function of the characteristics of signal which the respective adjusting means 49, 51 or 52 receive from the corresponding output of the evaluating circuit 56. Such signals are amplified at 54 before they reach the respective servomotors 53.

The evaluating circuit 56 further receives signals from temperature monitoring devices 57, 58 and 59 which respectively measure the temperature in the heating zones 31, 32 and 33.

Signals which are transmitted to the adjusting means 49, 51 and 52 serve to select the positions of the corresponding flaps 47 and hence the temperature of air streams which flow toward and through the outlets 41, 42, 43 to enter the respective heating zones 31, 32 and 33 and to influence the tension in the respective sections 22, 26 and 23 of the running web 2 in dependency on the intensity and/or other characteristics of signals from the monitoring devices 19, 21 and circuit 24. The arrangement is such that the heating action upon a web section wherein the tension is relatively high is reduced and the heating action upon a web section wherein the tension is relatively low is increased.

An important advantage of the improved method is that a relatively small number of measurements of tension in the web 2 suffices to obtain an accurate tension profile across the full width of the web. Another important advantage of the improved method is that the tension can be regulated with a high degree of accuracy and in a small area by resorting to relatively simple monitoring or ascertaining, heating and adjusting means.

If desired, the number of heating zones can be increased to four or more, or even reduced to two, without departing from the spirit of the invention. Furthermore, instead of relying on hot air, the web 2 can be heated by steam, thermal oil, directly by electric heaters, by a combustible gas or in any other suitable way.

The establishment of an operative connection between the tension ascertaining means 13 and the motor 16 for the advancing means 14 ensures that the web 2 exhibits a pronounced tension profile to thus enhance the efficiency of the heating means in achieving an equalization of tension across the full width of the web.

The apparatus can comprise a discrete heating means 36 with several heating units for two, three or all four stages of the dryer 1.

Those portions of a thermoplastic web which exhibit the so-called residual shrinkage tend to curl or to assume an undulate shape. The remaining portions of the web do not tend to curl or to undulate and, therefore, when the web is under tension, and tensional stress upon such remaining portions is more pronounced than in the portions which exhibit a residual shrinkage. It has been found that the residual shrinkage (as well as the tendency to assume an undulate shape) disappears in response to a more pronounced heating of the respective web portions in the heating unit and subsequent cooling of such web portions downstream of the heating unit.

Without further analysis, the foregoing will sof ully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of thermally influencing tension in a running elongated web of thermoplastic material, comprising the steps of ascertaining the tension in a plurality of longitudinally extending sections of the elongated web which are disposed side by side as considered transversely of the web; and admitting heat to said longitudinally extending sections at a rate which is a function of the ascertained tension in the respective sections to thereby influence the tension in said sections, including supplying lesser quantities of heat to sections wherein the tension is higher and supplying greater quantities of heat to sections wherein the tension is lower.

2. The method of claim 1, wherein the sections of the web include two marginal sections and said ascertaining step includes measuring the tension in the marginal sections of the web.

3. The method of claim 2, further comprising the step of processing the results of measurement of tension in the marginal portions of the web into signals denoting the tension profile across the web.

4. The method of claim 3, wherein said admitting step includes supplying heat to the marginal portions of the web as a function of the results of measurement of tension in the respective marginal portions and supplying heat to the web intermediate the marginal portions as a function of said signals.

5. The method of claim 3, wherein said admitting step includes supplying heat as a function of the intensity of said signals so as to maintain the tension of the web at a relatively low constant value.

* * * * *